US009311392B2

(12) United States Patent
Nakazawa et al.

(10) Patent No.: US 9,311,392 B2
(45) Date of Patent: Apr. 12, 2016

(54) DOCUMENT ANALYSIS APPARATUS, DOCUMENT ANALYSIS METHOD, AND COMPUTER-READABLE RECORDING MEDIUM

(75) Inventors: Satoshi Nakazawa, Tokyo (JP); Shinichi Ando, Tokyo (JP)

(73) Assignee: NEC CORPORATION, Tokyo (JP)

( * ) Notice: Subject to any disclaimer, the term of this patent is extended or adjusted under 35 U.S.C. 154(b) by 924 days.

(21) Appl. No.: 13/576,669

(22) PCT Filed: Jan. 25, 2011

(86) PCT No.: PCT/JP2011/051277
§ 371 (c)(1), (2), (4) Date: Aug. 2, 2012

(87) PCT Pub. No.: WO2011/099355
PCT Pub. Date: Aug. 18, 2011

(65) Prior Publication Data
US 2012/0304055 A1   Nov. 29, 2012

(30) Foreign Application Priority Data

Feb. 12, 2010 (JP) ................................ 2010-029392

(51) Int. Cl.
*G06F 17/24* (2006.01)
*G06F 17/30* (2006.01)
*G06F 17/21* (2006.01)

(52) U.S. Cl.
CPC ................................ *G06F 17/30699* (2013.01)

(58) Field of Classification Search
CPC .......... G06F 17/30011; G06F 17/3061; G06F 17/30539
See application file for complete search history.

(56) References Cited

U.S. PATENT DOCUMENTS 5,619,709 A * 4/1997 Caid ................. G06F 17/30265
  704/9
5,857,179 A * 1/1999 Vaithyanathan .... G06F 17/3071
(Continued)

FOREIGN PATENT DOCUMENTS

JP    2000-090110    3/2000
JP    2005-276115    10/2005
WO    2009113289    9/2009

OTHER PUBLICATIONS

IBM TAKMI—Text Mining System [online], IBM Tokyo Fundamental Research Laboratories, Retrieval: Jan. 8, 2010, Internet<URL:http://www.trl.ibm.com/projects/textmining/takmi/takmi.html>.

(Continued)

*Primary Examiner* — Scott Baderman
*Assistant Examiner* — Mario M Velez-Lopez
(74) *Attorney, Agent, or Firm* — Young & Thompson

(57) ABSTRACT

A document analysis apparatus comprises: a feature expression acquisition unit acquiring a feature expression appearing during an attention period in an analysis object document collection; a document collection acquisition unit acquiring a feature expression containing document (FECD) collection in which a feature expression appears, from an analysis population including an analysis object document collection; a context determination unit specifying an analysis/FECD corresponding to an analysis object document among a FECD collection for every feature expression, and specifies a context in which the feature expression appeared in multiple analysis/FECDs; a context comparison determination unit specifying a non analysis/FECD not corresponding to an analysis object document among a FECD collection, and within that, compares a context in which the feature expression has appeared and a context specified previously; and a feature degree setting unit performing giving or the like of a feature degree to a feature expression from the comparison.

6 Claims, 8 Drawing Sheets

(56) References Cited

U.S. PATENT DOCUMENTS

| | | | | |
|---|---|---|---|---|
| 6,502,091 B1* | 12/2002 | Chundi | ................... | G06F 17/30 707/738 |
| 6,532,469 B1* | 3/2003 | Feldman | ........... | G06F 17/30011 707/750 |
| 6,539,373 B1* | 3/2003 | Guha | ................ | G06F 17/30949 |
| 6,968,338 B1* | 11/2005 | Gawdiak | ........... | G06F 17/30625 707/741 |
| 7,599,930 B1* | 10/2009 | Burns | ................ | G06F 17/30672 |
| 7,984,035 B2* | 7/2011 | Levin | ................ | G06F 17/30864 707/706 |
| 8,577,893 B1* | 11/2013 | Patterson | .......... | G06F 17/30684 707/748 |
| 8,983,947 B2* | 3/2015 | Riedel | ................ | G06F 17/30672 707/728 |
| 2003/0220909 A1* | 11/2003 | Farrett | .............. | G06F 17/30864 |
| 2004/0054679 A1* | 3/2004 | Ralston | ............. | G06F 17/30684 |
| 2007/0094253 A1* | 4/2007 | Bent | ................. | G06F 17/30539 |
| 2007/0198506 A1* | 8/2007 | Attaran Rezaei | . | G06F 17/30675 |
| 2009/0319518 A1* | 12/2009 | Koudas | ............. | G06F 17/30864 |
| 2010/0262454 A1* | 10/2010 | Sommer | ................ | G06Q 30/02 706/20 |
| 2011/0047161 A1* | 2/2011 | Myaeng | ............ | G06F 17/30672 707/740 |
| 2011/0093414 A1* | 4/2011 | Xu | .......................... | G06F 17/27 706/12 |
| 2012/0095993 A1* | 4/2012 | Shau | ................. | G06F 17/30675 707/723 |

OTHER PUBLICATIONS

International Search Report PCT/JP2011/051277 dated Mar. 1, 2011, with English translation.

* cited by examiner

FIG. 6

| FEATURE EXPRESSION | COMMON "CONTEXT" |
|---|---|
| HERBAL MEDICINE | VEGETABLE DERIVATIVES, EFFECT, SYNTHETIC MEDICINE → DIFFERENCE |
| CLASSIFICATION | BUDGET, SUPERCOMPUTER, REDUCTION |
| NORTHERN EUROPE → NEW DEVELOPMENT | HEALTH FOOD A, HERBAL MEDICINE, RENAL FUNCTION, ACTIVATION |

DOCUMENT ANALYSIS APPARATUS, DOCUMENT ANALYSIS METHOD, AND COMPUTER-READABLE RECORDING MEDIUM

TECHNICAL FIELD

The present invention relates to a document analysis apparatus, a document analysis method, and a computer-readable recording medium which records a program, and in particular, relates to a technology for extracting a feature expression from a document collection which is made to be an analysis object.

BACKGROUND ART

In recent years, for the purpose of marketing, trend survey, or unusual-situation monitoring or the like in a telephone record of a call center, investigation of a phenomenon and incident occurring in an attention period is requested. In the investigation like this, first, a collection of a document with respect to an object which a user wants to analyze (hereinafter, referred to as "analysis object document") are collected. Then, from contents described in the analysis object document and an domain which is made to be an analysis object in the analysis object document, what kind of phenomenon and incident have arisen in the attention period is investigated.

As a technology for realizing the request of such investigation, a technology which carries out comparative analysis of a tendency of a document in the attention period and a tendency of a document in the past period before that based on a collection of the analysis object documents (time sequence document analytical technology) is known (refer to non-patent document 1, for example). Specifically, in the time sequence document analytical technology disclosed in the non-patent document 1, a feature expression which has seldom appeared in the past period, but appears in the attention period characteristically is extracted, and an analysis is performed based on the feature expression. Then, it is expected that the feature expression acquired by the time sequence document analytical technology disclosed in the non-patent document 1 (keywords etc., for example) indicates a phenomenon and an incident, etc. occurring in the attention period in the content described and the domain described in the analysis object document.

For example, it is assumed that a user investigates what kind of matters have become topics every month by making a blog including "health food A" be an analysis object. In this case, first, a collection of a blog including a description of "health food A" is acquired from the blog population as a collection of an analysis object document. Then, the collection of the acquired analysis object document (blog) is classified for every month based on the date of the blog, and furthermore, an appearance tendency of descriptive contents in the last month and this month is compared statistically. As the result, a user can know that feature expressions such as "herbal medicine", "classification", and "Northern Europe→new development" have appeared a great deal in November, 2009, as compared with the last month, for example. It becomes possible for a user to know efficiently a variation in an attention period in a domain which is made to be an analysis object by making such feature expressions be a clue.

Here, definitions of terms in the present specification will be described. A "feature expression" in the present specification means a linguistic expression which appears characteristically in a document collection which has become an attention object. Whether it corresponds to "appears characteristically" is determined from information, etc. of a document structure in each document such as a statistical deviation of appearance of the linguistic expression within the document collection, the document title, and the beginning of the document. A technology of seeking for such a linguistic expression which appears characteristically is a known technology for a person skilled in the art as a text-mining technology and a document abstract technology.

The linguistic expression means a chunk of one or more words cut from a text as a processing unit such as "word" and "phrase" etc. when an analysis of a text is carried out using a natural language processing technology. The linguistic expression may be what is acquired by performing a modification such as a synonym processing and a transformation processing which transforms a conjugational suffix into an end-form, for expressions which appear in the text. In addition, the linguistic expression may be what has a plurality of words and the information specifying the relation between the words, such as a dependency relation (example: "school"→"go") and a sub-tree of a syntactic-analysis result.

PRIOR ART DOCUMENT

Non-Patent Document

Non-patent document 1: "text-mining system IBM TAKMI-", [online], IBM Tokyo fundamental research laboratories, [Jan. 8, 2010 retrieval], and the Internet<URL:http://www.trl.ibm.com/projects/textmining/takmi/takmi.html>

SUMMARY OF THE INVENTION

Problems to be Solved by the Invention

By the way, as mentioned above, in the time sequence document analytical technology disclosed in the non-patent document 1, a feature expression which appears in an attention period characteristically is extracted from a comparison result between an attention period and the past period in an analysis object document collection. However, in the case of extracting a feature expression, it is not taken into consideration whether a situation and domain where each feature expression is described is limited to a domain which a user wants to make an analysis object. Therefore, a problem that a feature expression having few relations with a phenomenon and incident which have occurred in an attention period in a domain which a user makes an analysis object is extracted exists in the time sequence document analytical technology disclosed in the non-patent document 1

The above-mentioned problem will be specifically described in the following. Here, the "feature expression having few relations with a phenomenon and incident" means a feature expression which indicates an event which has become a topic in an attention period in a wide range of fields which are not limited to the analysis object, in the whole population of document collections independent of fields for an extreme example. Since it can not be said that such a feature expression corresponds to a phenomenon and incident to be originally an extraction object which have occurred in an analysis object domain even if such a feature expression corresponds to a characteristic feature of a phenomenon and incident which have occurred in an attention period, it is not preferable that such a feature expression will have been mixed with the extraction results.

For example, an example where a feature expression of a document with respect to above-mentioned "health food A"

in November, 2009 is investigated will be described. It is made to be assumed that "budget classification" that is a political event which is unprecedented heretofore became a topic on a grand scale, by chance, in November, 2009. As a result, the expression "classification" came to be described in documents of various fields. A political event like the "classification", or a derivative event which has occurred therefrom will have been extracted as a feature expression in November, 2009, since they are not a phenomenon limited to a specific domain, even in the case where time sequence analysis is performed while being limited to a specific analysis object document collection.

On the other hand, originally, a user performs the time sequence analysis for the purpose of knowing a trend in the "health food A" of an analysis object, for example, a point where the word "herbal medicine" has become important unprecedentedly because of an appearance of a new product. In such a purpose, a feature expression like "classification" will have become a noise.

An object of the present invention is to provide a document analysis apparatus, a document analysis method, and a program which are capable of dissolving an above-mentioned problem, specifying a feature expression which has not been described in a manner limited to a document collection to be an analysis object, and enhancing an extraction accuracy of a feature expression.

Means for Solving the Problems

To achieve above-mentioned objects, a document analysis apparatus in the present invention is provided with:

a document collection acquisition unit which accepts an analysis object document to be an analysis object as a first document collection, and furthermore, accepts as an input a feature expression appearing during an attention period specified in advance in said first document collection, and for every said feature expression, acquires a collection of documents which have been issued, generated or updated during said attention period and in which said acquired feature expression has appeared, as a second document collection from among document collections including said first document collection;

a context determination unit which, for every said feature expression, specifies a document corresponding to said analysis object document as a first feature expression containing document, among documents of said second document collection in which the feature expression has appeared, and furthermore, specifies a context which is common in two or more said first feature expression containing documents as the context of the feature expression, among contexts in which the feature expression has appeared in said first feature expression containing document;

a context comparison determination unit which, for every said feature expression, specifies a document which does not correspond to said analysis object document as a second feature expression containing document, among documents of said second document collection in which the feature expression has appeared, and furthermore, performs comparison between a context in which the feature expression has appeared in said second feature expression containing document and a context which said context determination unit has specified; and a feature degree setting unit which, based on a result of comparison by said context comparison determination unit, gives a feature degree to said feature expression, or corrects a feature degree in the case where a feature degree has been given to said feature expression in advance.

To achieve above-mentioned objects, a document analysis method in the present invention is provided with the steps of:

(a) accepting an analysis object document to be an analysis object as a first document collection, and furthermore, accepting as an input a feature expression which has appeared during an attention period specified in advance in said first document collection;

(b) acquiring, as a second document collection, a collection of documents which have been issued, generated or updated during said attention period and in which said acquired feature expression has appeared, from among document collections including said first document collection for every said feature expression;

(c) specifying, for every said feature expression, a document corresponding to said analysis object document as a first feature expression containing document among documents of said second document collection in which the feature expression has appeared, and furthermore, specifying a context which is common in two or more said first feature expression containing documents as the context of the feature expression, among contexts in which the feature expression has appeared in said first feature expression containing document;

(d) specifying, for every said feature expression, a document which does not correspond to said analysis object document as a second feature expression containing document, among documents of said second document collection in which the feature expression has appeared, and furthermore, performing comparison between a context in which the feature expression has appeared in said second feature expression containing document and a context specified in said Step (c); and (e) based on a result of a comparison by said Step (d), giving a feature degree to said feature expression acquired by said Step (a) or correcting a feature degree in the case where the feature degree has been given to said feature expression in advance in said Step (a).

To achieve above-mentioned objects, further, a computer-readable recording medium, in the present invention, in which a program including instructions is recorded, the instructions making a computer execute the steps of:

(a) accepting an analysis object document to be an analysis object as a first document collection, and furthermore, accepting as an input a feature expression which has appeared during an attention period specified in advance in said first document collection;

(b) acquiring, as a second document collection, a collection of documents which have been issued, generated or updated during said attention period and in which said acquired feature expression has appeared, from among document collections including said first document collection for every said feature expression;

(c) specifying, for every said feature expression, a document corresponding to said analysis object document as a first feature expression containing document among documents of said second document collection in which the feature expression has appeared, and furthermore, specifying a context which is common in two or more said first feature expression containing documents as the context of the feature expression, among contexts in which the feature expression has appeared in said first feature expression containing document;

(d) specifying, for every said feature expression, a document which does not correspond to said analysis object document as a second feature expression containing document, among documents of said second document collection in which the feature expression has appeared, and furthermore, performing comparison between a context in which the feature expression has appeared in said second feature expression containing document and a context specified in said Step (c); and (e) based on a result of a comparison by said Step (d), giving a feature degree to said feature expression acquired by said Step (a) or correcting a feature degree in the case where the feature degree has been given to said feature expression in advance in said Step (a).

Effect of the Invention

Owing to above-mentioned characteristic features, an extraction accuracy of a feature expression can be enhanced by specifying a feature expression which is not described in a manner limited to a document collection to be an analysis object, according to a document analysis apparatus, a document analysis method, and a computer-readable recording medium, in the present invention.

BRIEF DESCRIPTION OF THE DRAWINGS

FIG. 6 is a figure illustrating an example of a context in which a feature expression appears;

BEST MODES FOR CARRYING OUT THE INVENTION (Embodiment)

Figure 1:
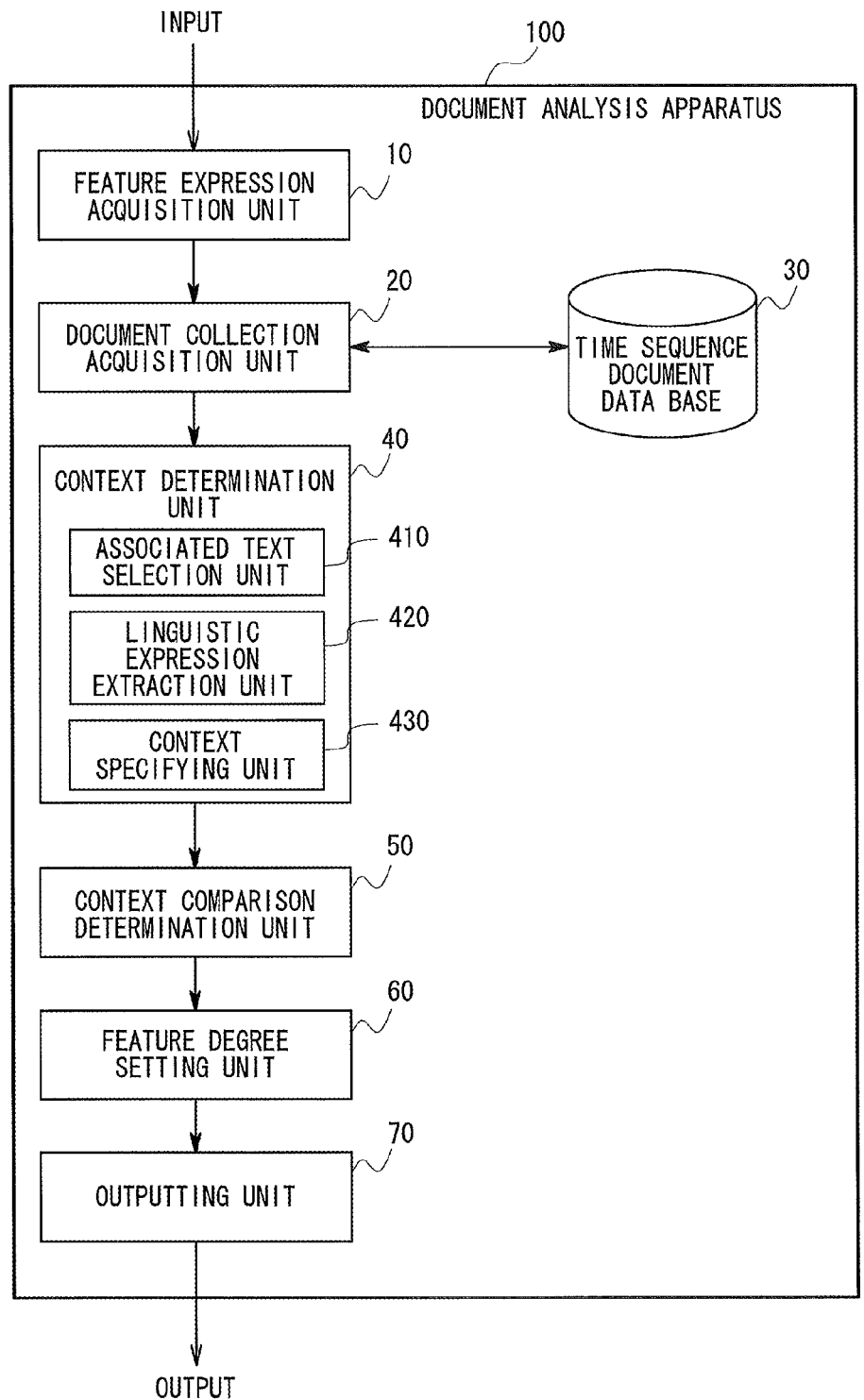
FIG. 1 is a block diagram illustrating a configuration of a document analysis apparatus in an embodiment of the present invention.

Hereinafter, a document analysis apparatus, a document analysis method, and a program, in an embodiment of the present invention, are described referring to FIGS. 1 to 7. First, a configuration of the document analysis apparatus in an embodiment will be described using FIG. 1. FIG. 1 is a block diagram illustrating a configuration of the document analysis apparatus in an embodiment of the present invention.

A document analysis apparatus 100 illustrated in FIG. 1, for a feature expression acquired from a collection of a document to be an analysis object (hereinafter "an analysis object document"), is a apparatus which gives or corrects a feature degree in accordance with a use in a collection of a document other than the analysis object document (hereinafter "non analysis object document"). As illustrated in FIG. 1, the document analysis apparatus 100 is provided with a feature expression acquisition unit 10, a document collection acquisition unit 20, a context determination unit 40, a context comparison determination unit 50, and a feature degree setting unit 60.

The feature expression acquisition unit 10, in a document collection including an analysis object document (hereinafter, "analysis object document collection"), acquires a feature expression which has appeared in an attention period specified in advance. The document collection acquisition unit 20 acquires a collection of a feature expression containing document (hereinafter, "feature expression containing document collection") from among a document collection including an analysis object document collection, i.e., a document collection to be an analysis population (hereinafter "analysis population"). The feature expression containing document is a document which is issued, generated or updated in an attention period, and in which a feature expression acquired by the feature expression acquisition unit 10 has appeared.

The context determination unit 40, for every feature expression, specifies a document corresponding to an analysis object document as an "analysis/feature expression containing document" among feature expression containing documents in which the feature expression has appeared. Furthermore, the context determination unit 40, for every feature expression, specifies a context which is common in two or more analysis/feature expression containing documents as a context of the feature expression among contexts in which a feature expression has appeared in the analysis/feature expression containing document.

The context comparison determination unit 50, for every feature expression, specifies a document which does not correspond to an analysis object document as a "non analysis/feature expression containing document" among feature expression containing documents in which a feature expression has appeared. Furthermore, the context comparison determination unit 50, for every feature expression, compares a context in which a feature expression has appeared in a non analysis/feature expression containing document with a context which the context determination unit 40 has specified.

The feature degree setting unit 60, based on a comparison result by the context comparison determination unit 50, gives a feature degree to a feature expression acquired by the feature expression acquisition unit 10, or corrects a feature degree which has been given in advance to a feature expression acquired by the feature expression acquisition unit 10.

In this way, in the document analysis apparatus 100 in the present embodiment, performed is comparison between a context in which a feature expression has appeared in a feature expression containing document included in an analysis object document collection and a context in which a feature expression has appeared in a feature expression containing document which does not correspond to an analysis object document. Then, as a result of comparison, in the case where both are the same or similar, it is estimated that a feature expression has appeared broadly. Therefore, according to the document analysis apparatus 100, a feature expression which has not been described in a manner limited to an analysis object document collection can be specified, and therefore, as a result, an extraction accuracy of a feature expression can be enhanced.

Here, a configuration of the document analysis apparatus 100 is more specifically described using FIGS. 2 to 6 in addition to FIG. 1. As illustrated in FIG. 1, in the present embodiment, the document analysis apparatus 100 is provided with a time sequence document data base 30 and an output unit 70. The time sequence document data base 30 stores a document collection which becomes an analysis population mentioned above. The time sequence document data base 30 will be described later further.

The feature expression acquisition unit 10, in the present embodiment, functions as an input reception unit which accepts information inputted to the document analysis apparatus 100 from the outside. The feature expression acquisition unit 10 accepts an input of a feature expression from a user by an input device, for example, and thereby, acquires a feature expression. A feature expression inputted may not be limited to be singular, but may be plural. For example, in the case of being plural, a feature expression is inputted by a list form. In addition, a numeric value (feature degree) which indicates a degree of a characteristic feature set in advance may be given to a feature expression, and in this case, pair data of a feature expression and a feature degree are inputted.

In the present embodiment, the feature expression acquisition unit 10 can also accept as an input an analysis object document selected as an analysis object by a user. In this case, the analysis object document may be document data itself, or may be a condition which specifies the analysis object document. As an example for the latter, a search condition for retrieving an analysis object document from the time sequence document data base 30 is included.

Here, a feature expression will be specifically described. For example, it is assumed that it is considered that a user wants to select a blog which includes a description "health food A" for the purpose of marketing of "health food A" from a blog currently exhibited in a certain blog service on the Internet now. In this case, the blog including the description "health food A" will become an analysis object document.

Then, in order to investigate a tendency variation of a content described with respect to "health food A", a user carries out comparison between an analysis object document prepared or the like in any month and an analysis object document prepared or the like in the previous month using an existing time sequence text-mining technology. Then, as a result of the comparison, a linguistic expression which appears characteristically in any month is extracted, and an extracted linguistic expression becomes a feature expression of the month.

Figure 2:
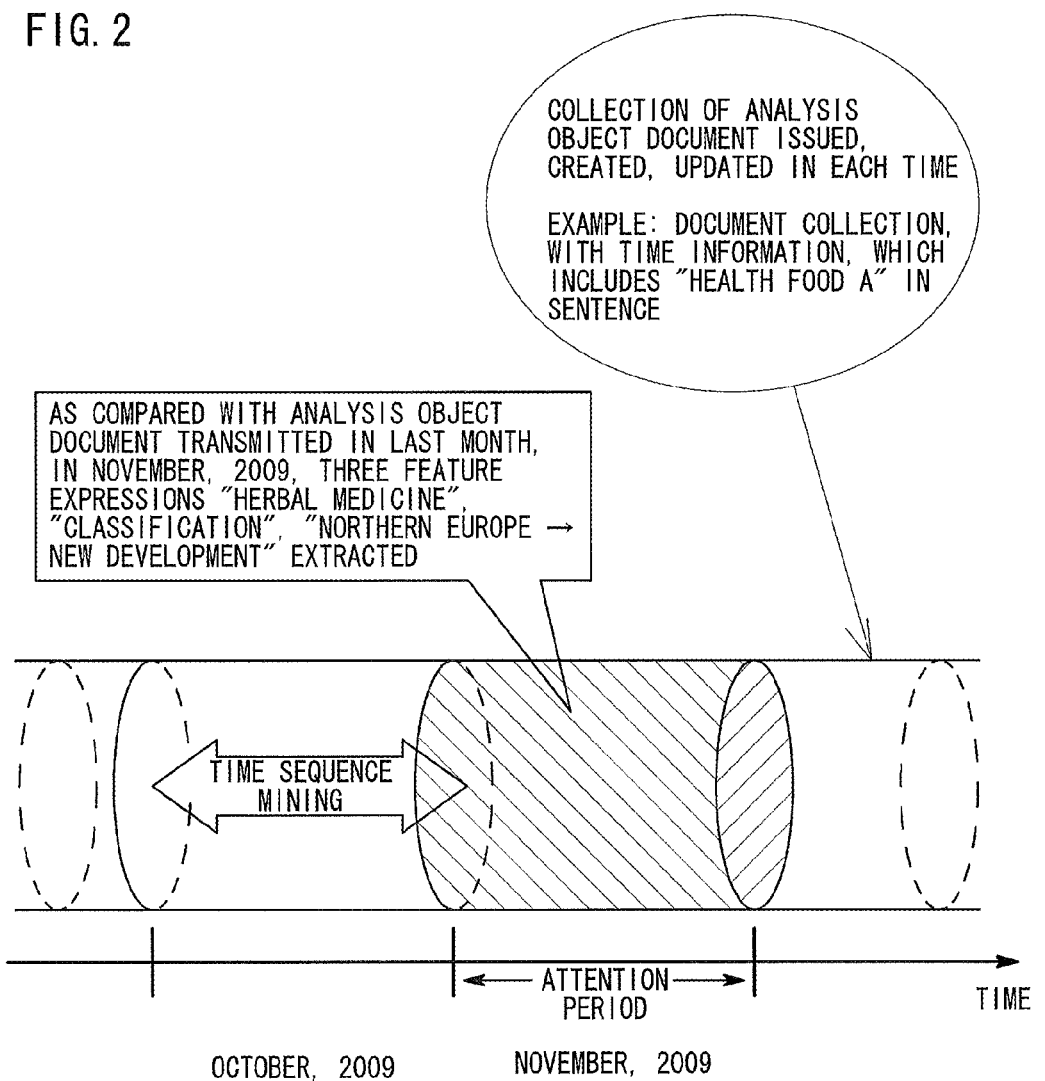
FIG. 2 is an explanatory view describing an example of a feature expression extracted from an analysis object document.

FIG. 2 is an explanatory view describing an example of a feature expression extracted from an analysis object document. In an example illustrated in FIG. 2, an attention period is set in November, 2009, and comparison is carried out between an analysis object document (blog) transmitted during an attention period and an analysis object document transmitted in October, 2009 of the previous month of the attention period. Then, as a result of comparison, as a feature expression, three feature expressions of "herbal medicine", "classification", and "Northern Europe→new development" have been acquired. In the example of FIG. 2, in the feature expression acquisition unit 10, a blog including "health food A" is inputted as an analysis object document, and three of "herbal medicine", "classification", and "Northern Europe→new development" are inputted as feature expressions in the attention period November, 2009.

A feature expression "Northern Europe→new development" indicates that two words of "Northern Europe" and "new development" in a text such as "newly developed in Northern Europe—" or "—newly developed in Northern Europe" are in a dependency relation. In an example illustrated in FIG. 2, a feature expression having a plurality of words such as "Northern Europe→new development" and the information which specifies a relation between them are also inputted other than a word such as "herbal medicine" and "classification". However, in an embodiment of the present invention, a feature expression is not limited to a single word and two single words which are in a dependency relation, and may be any linguistic expression.

The document collection acquisition unit 20, in the present embodiment, from a document collection (analysis population) stored in the time sequence document data base 30, acquires for every feature expression a document which is a document issued, prepared or updated in an attention period, and which includes a feature expression accepted by the feature expression acquisition unit 10. The document collection acquisition unit 20 delivers to the context determination unit 40 an acquired result that is a feature expression containing document.

In the present embodiment, which time information to use among issuing (transmitting is included), preparing and updating for determination of an attention period may be set in advance in accordance with a character of a document stored in the time sequence document data base 30, an object and a situation etc at the time of using the document analysis apparatus 100.

For example, as an example illustrated in FIG. 2, it is assumed that a blog exhibited in a certain blog service on the Internet is stored as an analysis population in the time sequence document data base 30. In this case, the document collection acquisition unit 20 acquires a blog including a feature expression "herbal medicine", a blog including a feature expression "classification", and a blog including a text to which a feature expression "Northern Europe→new development" conforms, as a feature expression containing document of each feature expression.

Besides, in the present embodiment, also the document collection acquisition unit 20 may function as an input reception unit which accepts information inputted from the outside in the same way as the feature expression acquisition unit 10. In this case, the document collection acquisition unit 20 accepts an input of a feature expression containing document from the outside. In this case, the document analysis apparatus 100 may be provided with an input reception unit which accepts an input of information from the outside as the feature expression acquisition unit 10 and the document collection acquisition unit 20.

The time sequence document data base 30, in the present embodiment, stores a document collection (analysis population) which includes an analysis object document of which input the feature expression acquisition unit 10 has accepted as an analysis object, and which becomes an analysis population, in a state where retrieval is possible in accordance with an instruction from the outside. Besides, specifically, what kind of document collection is stored as an analysis population is made to have been set in advance in accordance with a usage and an object at the time of using the document analysis apparatus 100 in the present embodiment.

In the present embodiment, time information which indicates a issuing time, preparation time or updating time of a document like a issuing date of a blog is given to all or a part of documents stored in the document data base 30. The document data base 30 is preferred to be provided with a function to retrieve only a document corresponding to a specified time range in accordance with time information specifying from the outside. For example, supposing "November, 2009" is specified in the case where blog data in a specific blog service is stored as an analysis population, the document data base 30 retrieves only a blog issued in November, 2009 from among stored blog data.

In the present embodiment, the document analysis apparatus 100 can also use an interface for a document retrieval such as a general document-retrieval service or the like which is exhibited on the Internet in place of the time sequence document data base 30. In this case, actual document data will have been stored in an outside database alternative to the document data base 30.

The context determination unit 40, as mentioned above, for each feature expression inputted into the feature expression acquisition unit 10, determines a "context" at the time when the feature expression appears in an analysis object document of an attention period. Here, in the present embodiment, a reason why determination of a context becomes needed will be described hereinafter, and in addition, details of the context determination unit 40 are also described.

As described in the section of "problem to be solved by the invention", extraction of a feature expression, based on a text-mining technology, is performed by carrying out comparison, among analysis object documents, between a document collection in a certain period in the past and a document collection in an attention period, and performed by extracting a linguistic expression which appears in an attention period characteristically. Therefore, in extracted feature expressions, a feature expression indicating a matter which has become a topic in an attention period in a wide range of field which is not limited to an analysis object document, for example, in the whole analysis population of a document collection irrelevant to fields may be included.

Then, as described in the section of "problem to be solved by the invention" it is made to be assumed that "classification of a budget" which was a political event unprecedented until then became a topic on a grand scale by chance in November, 2009 set as an attention period (refer to FIG. 2). As a result, the expression "classification" will be described in documents in various fields. That is, "classification" indicates one political event or a derivative event produced therefrom which is not susceptible to an influence of fields, and is not a phenomenon limited to a specific field. However, irrespective of it, even in the case where a feature expression is extracted only within a specific analysis object document (time sequence analysis), "Classification" is extracted as a feature expression in November, 2009.

Therefore, in the case where a user extracts a feature expression of an analysis object document in an attention period for the purpose of knowing a trend in "health food A" which is wanted to be an analysis object, "classification" which appears in documents of various fields without not being limited to an analysis object document is a feature expression which disturbs a object achievement. Therefore, a feature expression like "classification" corresponds to a feature expression which a user hopes to remove or of which a feature degree a user hopes to have set low.

In the present embodiment, determination of a context is performed in order to discriminate a feature expression which is not preferable like this and a feature expression which is preferable. An appearance state of each feature expression can be categorized into three cases of FIGS. 3, 4, and 5 in accordance with a distribution of a feature expression containing document containing the feature expression, and a "context" in which a feature expression is used in a feature expression containing document. Therefore, determination of a context is performed assuming these three cases. Hereinafter, each case is described using figures.

Figure 3:
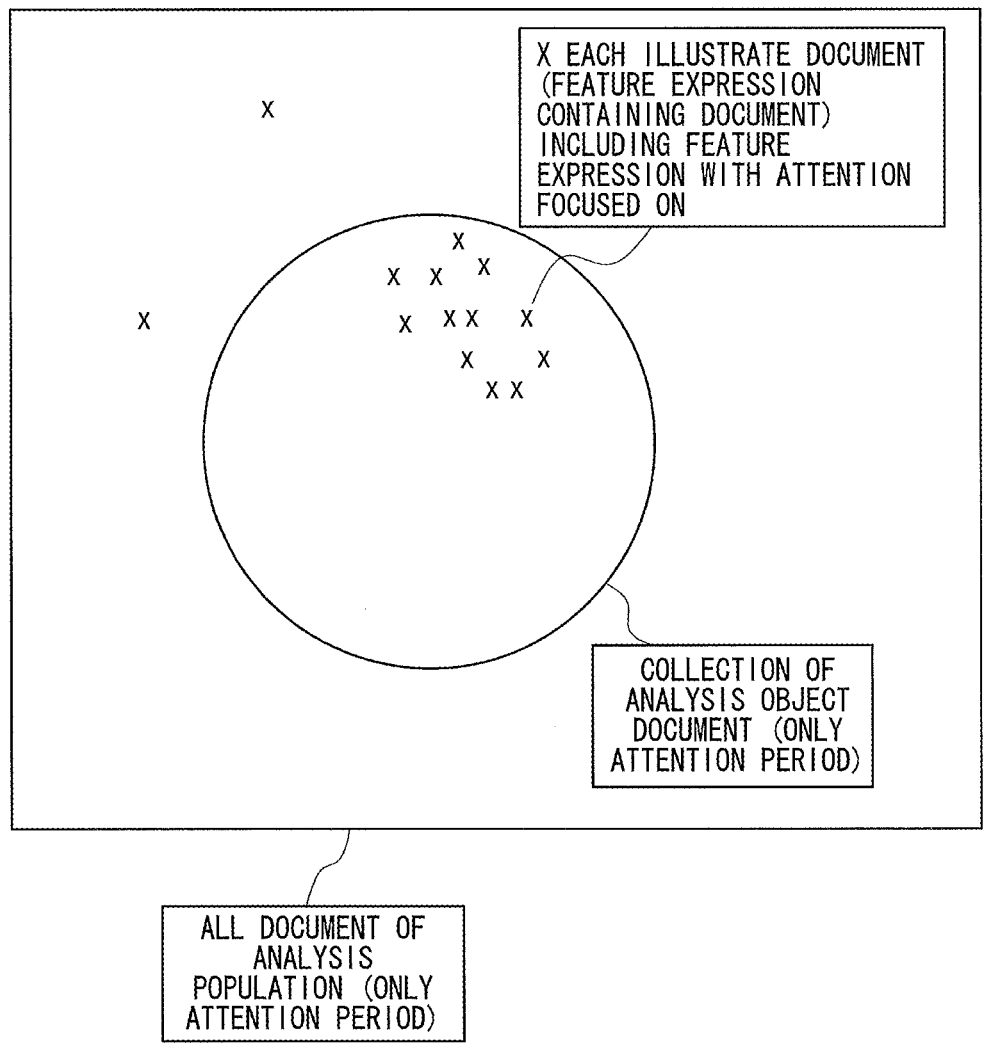
FIG. 3 is a figure indicating a first appearance state of a feature expression in an analysis object document and a non analysis object document.

FIG. 3 is a figure indicating a first appearance state of a feature expression in an analysis object document and a non analysis object document. In FIG. 3, indicated is an appearance state where all or most of feature expression containing documents are included in analysis object documents, and any appearance does not exist in documents (non analysis object document) other than an analysis object document. "X" in FIG. 3, each indicates a feature expression containing document.

As illustrated in FIG. 3, most "X" are included in analysis object documents in the example. At this time, a feature expression appears characteristically in an analysis object document not only in the case of comparing an attention period with a past period, but even in the case of comparing a non analysis object document with an analysis object document in an attention period. Therefore, in the case of an example illustrated in FIG. 3, it is not necessary to calculate a feature degree of a feature expression low, or to correct it.

Besides, if a correction is carried out, based on comparison between the number of documents which are feature expression containing documents and are not analysis object documents (referred to as a non analysis/feature expression containing document) and the number of documents which are feature expression containing documents and are included in analysis object documents (referred to as an analysis/feature expression containing document), carried out may be a correction that the more a value of the former against the latter becomes large, the lower the feature degree of the corresponding feature expression is made. In an example of FIG. 3, it is considered that a feature degree is not corrected low greatly since a value of the former becomes small. Further, in place of the number of non analysis/feature expression containing documents, an appearance frequency of a feature expression within the non analysis/feature expression containing document may be used, and in place of the number of analysis/feature expression containing documents, an appearance frequency of a feature expression within the analysis/feature expression containing document may be used.

Figure 4:
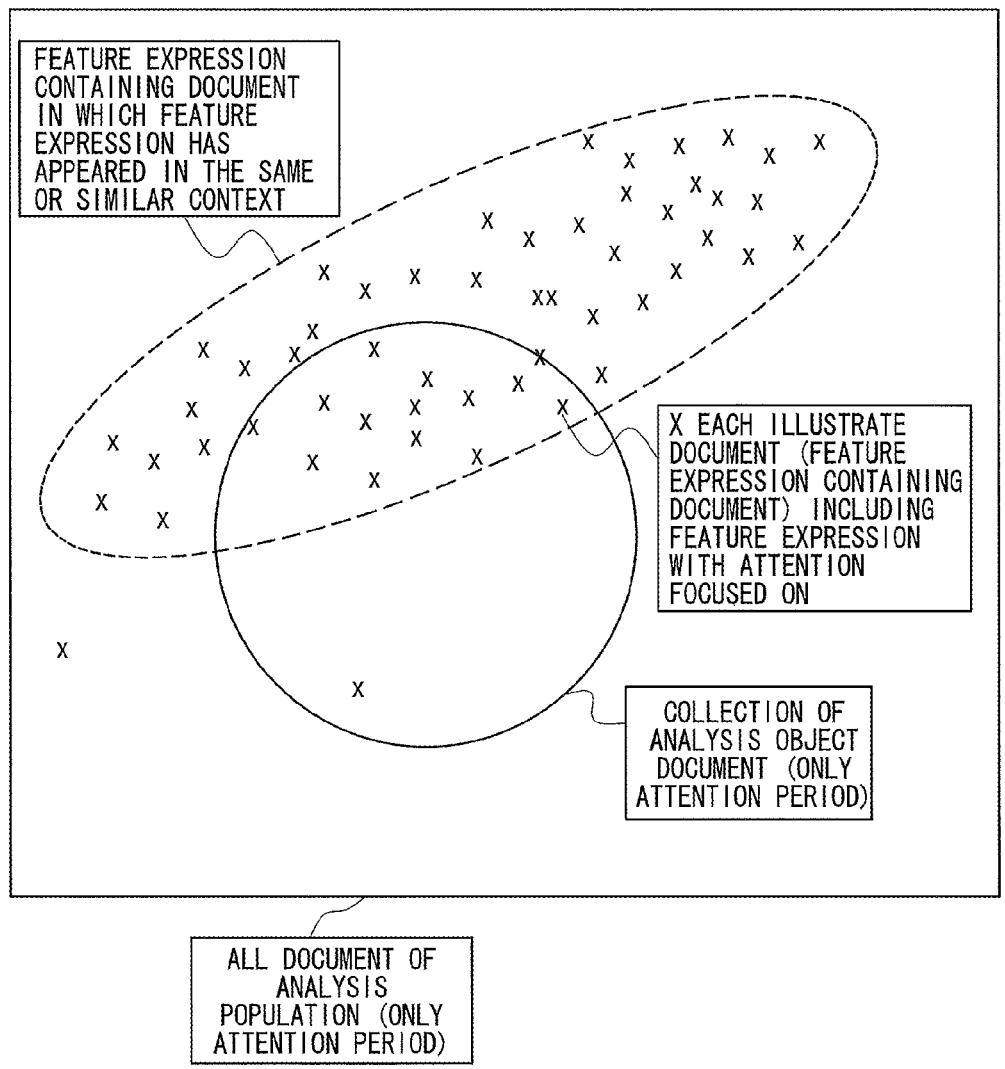
FIG. 4 is a figure illustrating a second appearance state of a feature expression in an analysis object document and a non analysis object document.

On the other hand, FIG. 4 is a figure illustrating a second appearance state of a feature expression in an analysis object document and a non analysis object document. In FIG. 4, a feature expression appears not only in an analysis object document, but in document of a wide range of fields, and moreover, illustrated is an appearance state where a context in which a feature expression has appeared in an analysis object document and a context in which a feature expression has appeared in a non analysis object document have become the same or similar. An appearance state of the feature expression "classification" illustrated in above-mentioned FIG. 2 corresponds to an example of FIG. 4. Therefore, "Classification" has appeared, in a document of various fields in an attention period, in the same or similar context, i.e., in a context with respect to a newsy event called classification of a budget.

Therefore, with respect to a feature degree of a feature expression like "classification", correcting as follows is preferred. First, comparison is carried out between the number of non analysis/feature expression containing documents in which a feature expression has appeared in the same or similar context and the number of analysis/feature expression containing documents in which a feature expression has appeared in the same or similar context. At this time, in place of the number of non analysis/feature expression containing documents, an appearance frequency of a feature expression within a non analysis/feature expression containing document may be used, and in place of the number of analysis/feature expression containing documents, an appearance frequency of a feature expression within an analysis/feature expression containing document may be used. Then, based on the result of comparison, carried out is a correction so that the more a value of the former against the latter becomes large, the lower the feature degree of the corresponding feature expression may be made.

Furthermore, in an example of FIG. 4, correction may be performed so that the wider an area of a non analysis object document becomes within an area surrounded by a dotted line in FIG. 4, and the more the number of feature expression containing documents included in an area of a non analysis object document increases, the lower a feature degree of the corresponding feature expression may become.

Figure 5:
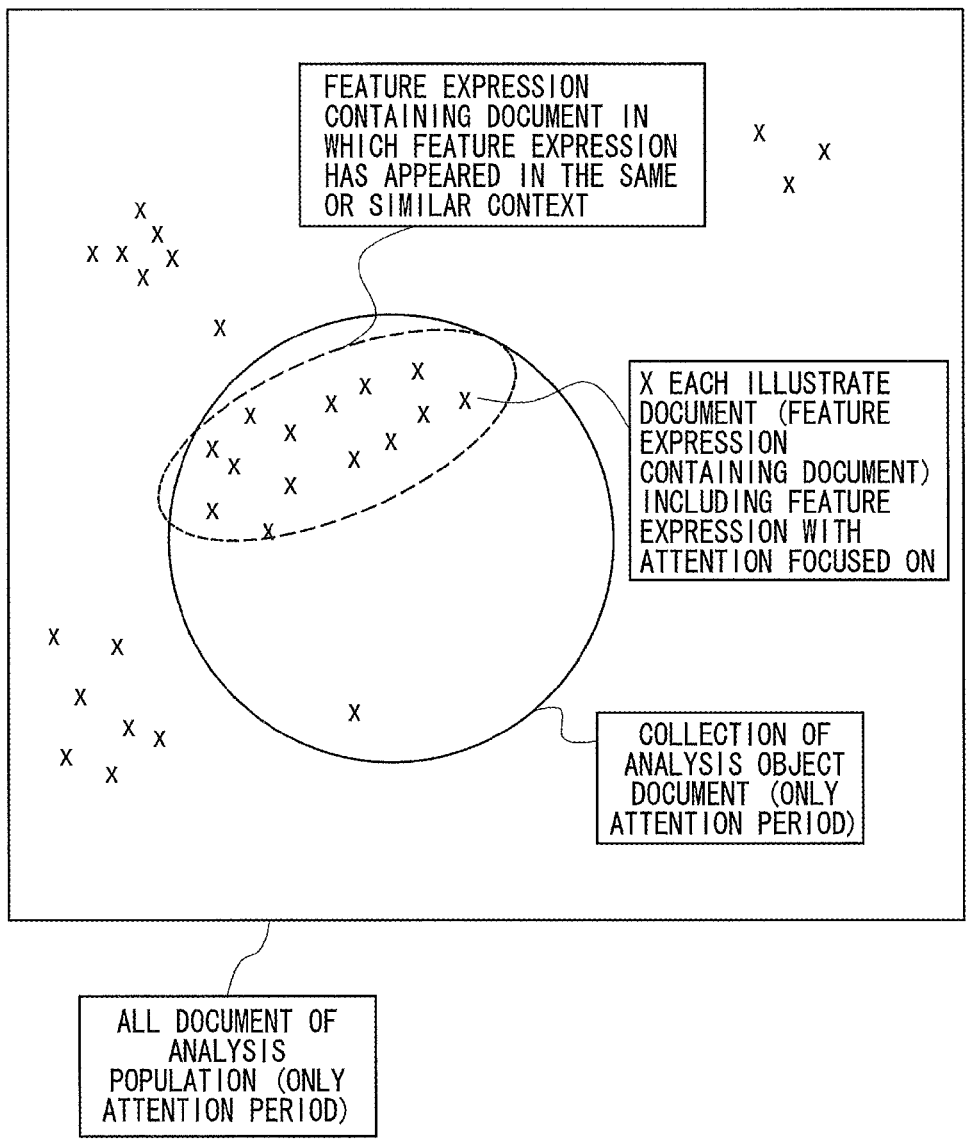
FIG. 5 is a figure illustrating a third appearance state of a feature expression in an analysis object document and a non analysis object document.

FIG. 5 is a figure illustrating a third appearance state of a feature expression in an analysis object document and a non analysis object document. In FIG. 5, an appearance state where a feature expression has appeared not only in an analysis object document but in an analysis population broadly is illustrated. A difference between an appearance state illustrated in FIG. 5 and an appearance state illustrated in FIG. 4 is a point that a context in which a feature expression has appeared in an analysis object document and a context in which a feature expression has appeared in a non analysis object document are different from each other. For example, a feature expression "Northern Europe→new development" illustrated in above-mentioned FIG. 2 corresponds to an example of FIG. 5.

Specifically, it is made to be assumed that a feature expression "Northern Europe→new development", in an analysis object document, for example, has appeared in the context that an improvement method of health food A has been newly developed in Northern Europe, such as "by means of a method newly developed in Northern Europe, a herbal medicine effective ingredient of health food A rises", or "a new product of the health food A sold this time, a component for a renal function activation newly developed in Northern Europe . . . ".

In contrast to that, in a non analysis object document, it is made to be assumed that a feature expression "Northern Europe→new development" has appeared in a context with respect to another matter, such as "A virus newly developed proliferates in Northern Europe", or "CM strategy aiming at market new development in Northern Europe" for example. A feature expression which appears in such different contexts is irrelevant to a feature degree of a feature expression in an analysis object document. Therefore, it is considered that there is no necessity of correcting a feature degree of a feature expression like this.

As mentioned above, in an embodiment of the present invention, each feature expression inputted into the feature expression acquisition unit 10 is categorized into any of the three cases illustrated in FIGS. 3, 4, and 5 which are mentioned above. After that, depending on a case, setting (or correction) of a feature degree is performed to each feature expression.

The context determination unit 40, in the present embodiment, for the above-mentioned categorization, after having specified an analysis/feature expression containing document, determines first whether a relation between the number of analysis/feature expression containing documents and the number of feature expression containing documents in an analysis population fulfils a setting condition with respect to each feature expression. Specifically, the context determination unit 40, with respect to each feature expression, calculates first a ratio of the number of analysis/feature expression containing documents to the whole feature expression containing document and compares the calculated value with a threshold value set in advance.

Then, the context determination unit 40 determines that the feature expression which has become the object has appeared in a state illustrated in FIG. 3, in the case where the calculation value becomes not less than a threshold value, i.e., in the case where many of feature expression containing documents are included in an analysis object document. Therefore, in this case, the context determination unit 40 does not perform determination of a context within an analysis object document with respect to the feature expression which has become the object, and notifies the context comparison determination unit 50 of the result. In this case, the context comparison determination unit 50 does not perform processing, either. As described in a description with respect to FIG. 3, this is because it is not necessary to determine whether the feature expression which has become the object is the same as, or similar to, the context within an analysis object document since the feature expression appears little in a non analysis object document in the case of an appearance state illustrated in FIG. 3. It is not necessary either to perform correction of a feature degree for this feature expression by the feature degree setting unit 60.

On the other hand, the context determination unit 40, in the case where the calculation value is smaller than a threshold value set in advance, specifies a context in which the feature expression has appeared in an analysis object document in order to determine whether an appearance state of the feature expression is either of the case of FIG. 4 or the case of FIG. 5.

Here, in the present embodiment, the "context" means a topic of a text in a part in which a feature expression appears within a document, an incident, an event, and an opinion or the like described in the text. Therefore, if a context in which a feature expression appears differs, it is determined that the feature expression indicates other content even in the case where the feature expression is the same. A context is expressed by a list of a linguistic expression which indicates it directly, or of a linguistic expression which has a high index value indicating association of a coincidence probability or the like. Furthermore, a context may be expressed by a vector having weighting acquired by giving weighting to each linguistic expression.

In the present embodiment, as described later, the context determination unit 40, with respect to each feature expression, specifies a context in an analysis/feature expression containing document for every document, and furthermore, specifies among specified contexts a context appearing in common in a plurality of analysis/feature expression containing documents. Then, the context determination unit 40 delivers pair data between the calculated context which appears in common and the feature expression to the context comparison determination unit 50. An example of the pair data given to the context comparison determination unit 50 is indicated in FIG. 6 described later.

Therefore, in the present embodiment, the context determination unit 40 is provided with a associated text specifying unit 410, a linguistic expression extraction unit 420 and a context specifying unit 430 as illustrated in FIG. 1 in order to carry out specifying of a context for every document, and specifying of a context in which a feature expression appears in common. However, a configuration of the context determination unit 40 is not limited to a configuration illustrated in FIG. 1. The context determination unit 40 may be what carries out a general text mining, and specifies a context in which a feature expression appears in common with a plurality of analysis/feature expression containing documents as an object, for example. Hereinafter, the associated text specifying unit 410, the linguistic expression extraction unit 420, and the context specifying unit 430 will be described.

The associated text selection unit 410, for extracting a context of a feature expression in the document from a text in an analysis/feature expression containing document, selects a text part associated with the feature expression. As an associated text part, a text (proximity text) close to the text in which a feature expression appears is included. As for specifying of a proximity text, in the present embodiment, a condition by which a proximity text is made to be determined in advance, for example, a distance from a feature expression appearance part (the number of characters or the number of single words from a feature expression appearance part, etc.) is made to be determined and the specifying can be performed based on the determined condition. In addition, a condition by which a proximity text is made to be determined can also be determined using a separation by means of a document structure such as a sentence and a paragraph.

Furthermore, the associated text selection unit 410 may specify not a feature expression itself but a pronoun (a zero pronoun is included) indicating a feature expression based on a correspondence analysis technology, and may include the proximity text of the appearance part of the pronoun in an associated text part. The associated text selection unit 410 may divide a feature expression containing document based on a topic division technology, and may select a text of a topic including a feature expression or a pronoun indicating it as an associated text part.

The associated text specifying unit 410, even in the case of adopting any process, selects an associated text part from an analysis/feature expression containing document with respect to each of all the feature expressions except a feature expression where an appearance state is a state illustrated in FIG. 3, and delivers the selected associated text part to the linguistic expression extraction unit 420.

The linguistic expression extraction unit 420 accepts a result of the associated text specifying unit 410, and extracts a linguistic expression (or a group of linguistic expressions) indicating a context of a feature expression from an associated text part in each analysis/feature expression containing document. The "context" here means, although the meaning is the same as that of a case described in above description with respect to the context determination unit 40, a topic in an associated text part corresponding to a feature expression, an incident described in an associated text, an event, and an opinion, etc.

Therefore, specifically, the linguistic expression extraction unit 420 can extract a "context" by using a method shown in following (a) to (d):
(a) a method of extracting a topic word (topic linguistic expression) of an associated text part using a topic determination technology;
(b) a method of extracting an important word (important linguistic expression) or 5W1H information in an associated text using a document abstract technology and an intrinsic expression extraction technology;
(c) a method of extracting an opinion expression in an associated text using an opinion sentence extraction technology; and
(d) a method of carrying out word vectorization of a single word in an associated text.

Whether to use any of above-mentioned methods, or whether to combine any of them is determined in advance in accordance with a usage and a purpose, a property of a document collection made to be an analysis object in the case of using the document analysis apparatus 100 in an embodiment of the present invention.

The context specifying unit 430, for every feature expression, determines whether a linguistic expression which indicates a context which the linguistic expression extraction unit 420 extracts from each analysis/feature expression containing document has appeared in common in two or more analysis/feature expression containing documents. Then, the context specifying unit 430, as a result of the determination, outputs to the context comparison decision unit 50 a linguistic expression determined to have appeared in common as a common context of the feature expression in an analysis/feature expression containing document.

In the present embodiment, "linguistic expression which has appeared in common" may not necessarily be a linguistic expression common to all the analysis/feature expression containing documents. For example, "linguistic expression which has appeared in common" may be a linguistic expression which has appeared in common in an analysis/feature expression containing document in not less than threshold value set in advance.

Furthermore, the context specifying unit 430, for every feature expression, selects from the high order a certain number of linguistic expressions for which the number of an analysis/feature expression containing documents in which the linguistic expressions have appeared is large among linguistic expressions determined to have appeared in common, and can also output them to the context comparison determination unit 50 as contexts which are common to the feature expression.

In the present embodiment, the context specifying unit 430, as indicated in FIG. 6, can aggregate for every feature expression "linguistic expression which has appeared in common", i.e., contexts, and can deliver them to the context comparison determination unit 50. FIG. 6 is a figure indicating an example of contexts in which a feature expression has appeared.

The context comparison determination unit 50, in the present embodiment, except a feature expression which the context determination unit 40 has determined to have appeared in a state illustrated in FIG. 3, with respect to each feature expression, determines whether a context in which a feature expression has appeared in a non analysis/feature expression containing document is in the same or similar relation with a context within an analysis/feature expression containing document specified by context determination unit 40.

Specifically, the context comparison determination unit 50, first, before the above-mentioned determination, specifies a context in which a feature expression has appeared with a non analysis/feature expression containing document as an object. At this time, specifying of the context is possible to be performed based on the same method as the method of extracting a context for every document used by the context determination unit 40. Subsequently, the context determination unit 50 determines whether contexts are in the same or similar relation based on capturing a group of linguistic expressions indicating each context as word vectors, and based on whether the word vectors are in agreement, or whether a distance between word vectors is not more than a threshold value set in advance.

Describing three feature expressions indicated in FIG. 2 as an example, first, a feature expression "herbal medicine" is determined for the appearance state to be a state indicated in FIG. 3 by the context determination unit 40, and is excluded from objects of context comparison. Then, the context determination unit 50, with a feature expression "classification" and a feature expression "Northern Europe→new development" as an object, performs comparison each between the context in a non analysis/feature expression containing document and the context acquired as a result of the context determination unit 40, and calculates the number of non analysis/feature expression containing documents in which the feature expression has appeared in a context which is the same or similar as a context acquired by the context determination unit 40 as a result.

In examples of FIG. 4 and FIG. 5, a document included in an area which is within an ellipse of a dotted line and outside of a circle of a solid line which indicates an analysis object document will be calculated. As for this calculated number of non analysis/feature expression containing documents in which a feature expression has appeared (or a ratio to the number of feature expression containing documents) in a context which is the same or similar as a context acquired by the context determination unit 40, if the number is larger than a threshold value set in advance, FIG. 4 is determined to be the case, and if smaller, FIG. 5 is determined to be the case.

However, in the case of using a formula correcting/calculating a feature degree common in the cases of FIG. 4 and FIG. 5 in the feature degree setting unit 60 described later, it is not necessary always to determine whether each feature expression is either of the cases of FIG. 4 and FIG. 5.

In an example of a feature expression indicated in FIG. 2, a feature expression "classification" appears a great deal also in a non analysis object document in the same or similar context as a context in an analysis object document, and therefore, it can be determined to be the state illustrated in FIG. 4. On the other hand, as for a feature expression "Northern Europe→new development", most feature expressions appearing in a non analysis object document have appeared in contexts different from those in an analysis object document, and therefore, it can be determined to be the state illustrated in FIG. 5.

The feature degree setting unit 60, in the present embodiment, for every feature expression, performs giving of a feature degree to a feature expression or correcting of an existing feature degree based on the number of documents which are calculated by the context comparison determination unit 50, and which are a non analysis/feature expression containing document, and in which a context is determined to be in the same or similar relation as a context within an analysis object document.

Specifically, the feature degree setting unit 60, in the case where pair data of a feature expression and feature degree are inputted into the feature expression acquisition unit 10, corrects the inputted feature degree based on the number of the above-mentioned analysis/feature expression containing documents. On the other hand, the feature degree setting unit 60, in the case where only a feature expression is inputted into the feature expression acquisition unit 10, first, calculates a feature degree in an analysis object document for every feature expression using a general text-mining technology. Then, the feature degree setting unit 60 corrects a feature degree calculated based on the number of documents which are above-mentioned non analysis/feature expression containing documents, and in which a context is determined to be in the same or similar relation as a context within an analysis object document, and gives a feature degree after this correction to a feature expression.

Correction of a feature degree, for example, as compared with the number of analysis/feature expression containing documents, is performed so that the more is the number of non analysis/feature expression containing document in which a context with a feature expression appearing is in the same or similar relation as that within an analysis/feature expression containing document, the lower the feature degree may become. Besides, in this correction, a relation between the number of non analysis/feature expression containing documents and a feature degree can be prescribed by a function. The function may be configured in advance in a range where a policy of the above-mentioned correction is fulfilled in accordance with a usage and purpose of the document analysis apparatus 100, a property of a document collection assumed as an analysis object or the like in the present embodiment.

Among three feature expressions illustrated in FIG. 2, the feature expression "herbal medicine" appears in the state illustrated in FIG. 3, and therefore, a feature degree with respect to the "herbal medicine" is not corrected. On the other hand, the feature expression "classification" appears in the state illustrated in FIG. 4. Therefore, as compared with the number of an analysis/feature expression containing documents in FIG. 4, since the number of non analysis/feature expression containing documents in which a context with a feature expression appearing is in the same or similar relation as that within an analysis/feature expression containing document is large, a feature degree of the feature expression "classification" is corrected low. Besides, in FIG. 4, the number of analysis/feature expression containing documents is indicated with the number of X located in an area surrounded by a solid line in a circle shape, and the number of non analysis/feature expression containing documents is indicated with the number of X in an area which does not overlap with an area surrounded by a solid line within an area surrounded by a dotted line in a elliptical shape.

The feature expression "Northern Europe→new development" appears in the state illustrated in FIG. 5. Therefore, with respect to the feature expression "Northern Europe→new development", the number of non analysis/feature expression containing documents in which a context with a feature expression appearing is in the same or similar relation as that within an analysis/feature expression containing documents will be 0 (zero). Accordingly, a feature degree with respect to the feature expression "Northern Europe→new development" is not corrected, either.

Besides, in a process in the above-mentioned context determination unit 40 and feature degree setting unit 60, in place of the number of feature expression containing documents, in contrast to that, a value acquired by performing weighting in consideration of an appearance frequency of a feature expression within all the documents may be used. For example, in the case of using a simple document number, both a document in which a feature expression appears only once and a document in which a feature expression appears many times are counted as "one" in the same way. However, in consideration of this point, a method where a document in which a feature expression appears many times rather than a document in which a feature expression appears only once are counted with much weighting in accordance with the appearance frequency may be taken in.

In addition, the outputting unit 70, in the present embodiment, outputs outside a feature degree for every feature expression calculated by the feature degree setting unit 60 together with the feature expression. At this time, the outputting unit 70 may carry out comparison between a threshold value set by a user in advance with respect to a feature degree and a feature degree of each feature expression, and may exclude feature expressions less than or not more than a threshold value, and may output only remaining feature expressions or pairs between remaining feature expressions and feature degrees thereof. As an output destination of the outputting unit 70, a display device, a printer and other devices connected by a network are included. Furthermore, selection of output destinations is performed suitably in accordance with a usage state of the document analysis apparatus 100.

Figure 7:
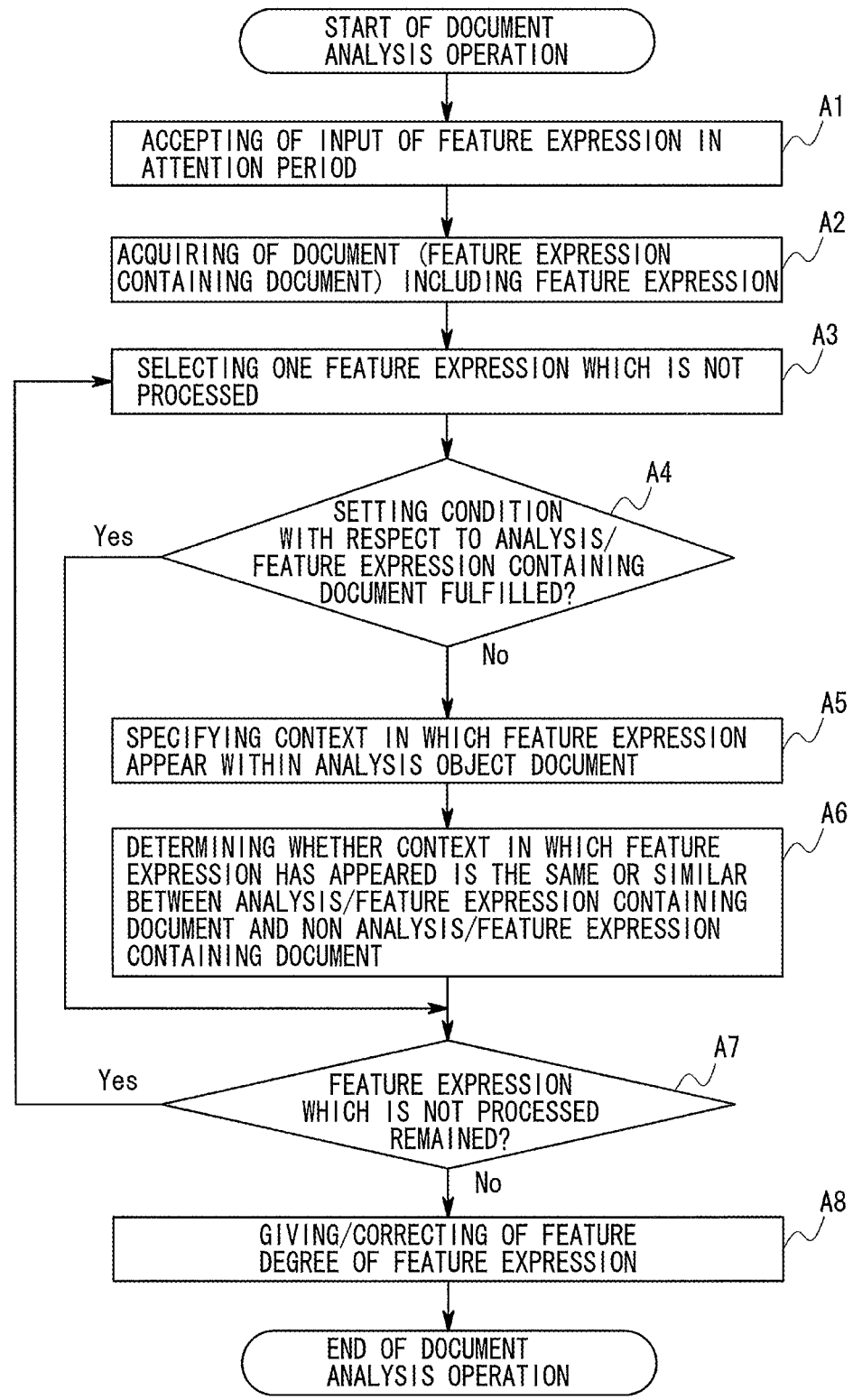
FIG. 7 is a flow chart illustrating an operation of a document analysis apparatus in an embodiment of the present invention.

Then, an operation of the document analysis apparatus 100 in an embodiment of the present invention will be described using FIG. 7. FIG. 7 is a flow chart illustrating an operation of the document analysis apparatus in an embodiment of the present invention. In the following description, FIGS. 1 to 6 are taken into consideration suitably. In the present embodiment, by making the document analysis apparatus 100 operate, a document analysis method is carried out. Therefore, description of a document analysis method in the present embodiment is substituted by the following operation descriptions of the document analysis apparatus 100.

As illustrated in FIG. 7, first, the feature expression acquisition unit 10 accepts an input of feature expressions which have appeared during an attention period specified in advance, and acquires these (Step A1). In the present embodiment, in Step A1, the feature expression acquisition unit 10, furthermore, accepts also an input of a search condition for acquiring an analysis object document selected by a user as an analysis object from the time sequence data base 30.

Next, the document collection acquisition unit 20 acquires for every feature expression a document which is a document issued, prepared or updated in an attention period, and which includes a feature expression accepted by the feature expression acquisition unit 10 from an analysis population stored in the time sequence document data base 30 (Step A2). In Step A2, the document collection acquisition unit 20 retrieves an analysis object document based on the search condition inputted in Step A1, and carries out also acquisition of an analysis object document.

Next, the context determination unit 40 selects feature expressions for which processes after Step A4 are not yet performed among feature expressions inputted in Step A1, and specifies an analysis/feature expression containing document with respect to the selected feature expressions (Step A3).

Next, the context determination unit 40, with respect to feature expressions selected in Step A3, determines whether a relation between the number of analysis/feature expression containing documents and the number of feature expression containing documents in an analysis population fulfils setting conditions (Step A4). Specifically, the context determination unit 40, with respect to selected feature expressions, calculates a ratio of the number of analysis/feature expression containing documents to the whole feature expression containing documents, and determines whether the calculated value is not less than a threshold value set in advance (fulfils setting conditions).

As a result of determination in Step A4, in the case where setting conditions are fulfilled, Step A7 described later or subsequent steps are carried out. On the other hand, as a result of determination in Step A4, in the case where setting conditions are not fulfilled, the context determination unit 40 specifies a context in which the feature expression has appeared within the analysis object document (analysis/feature expression containing document) (Step A5).

Next, after execution of Step A5, the context comparison determination unit 50 determines whether a context in which a feature expression selected in Step A3 has appeared in a non analysis/feature expression containing document and a context in which it has appeared within an analysis/feature expression containing document are in the same or similar relation (Step A6). The context comparison determination unit 50 outputs a determination result to the feature degree setting unit 60 after execution of Step A6.

Next, the context determination unit 50 determines whether a feature expression for which processes after Step A4 are not yet performed remains among feature expressions inputted in Step A1 (Step A7). As a result of determination in Step A7, in the case where a feature expression for which a process is not performed remains, the context determination unit 50 makes the context determination unit 40 execute Step A3. On the other hand, as a result of determination in Step A7, in the case where a feature expression for which a process is not performed does not remain, the context determination unit 50 instructs the feature degree setting unit 60 to execute Step A8.

In Step A8, the feature degree setting unit 60 gives feature degrees to feature expressions acquired in Step A1, or corrects feature degrees given in advance to feature expressions acquired in Step A1 based on the result of comparison determination in Step A6. Then, after execution of Step A8, feature degrees for every feature expression calculated by the feature degree setting unit 60 are sent to the outputting unit 70 together with feature expressions, and outputted to the outside therefrom.

As mentioned above, according to the present embodiment, a feature expression appropriate to an analysis object document of an attention period is specified from among feature expressions appearing in an analysis object document, and this feature expression is discriminated from a feature expression which has appeared without being limited to an analysis object document although it has appeared in an attention period. Then, a feature degree of each feature expression is corrected based on the above-mentioned specified result, and thereby, an extraction accuracy of a feature expression is enhanced.

Furthermore, a program in the present embodiment may be a program which makes a computer execute Steps A1 to A8 illustrated in FIG. 7. The document analysis apparatus 100 and the document analysis method in the present embodiment can be realized by installing this program in a computer and by being executed. In this case, a CPU (Central Processing Unit) of the computer functions as the feature expression acquisition unit 10, the document collection acquisition unit 20, the context determination unit 40, the context comparison determination unit 50, the feature degree setting unit 60, and the outputting unit 70, and performs processing.

In the present embodiment, the time sequence document data base 30 can be realized by storing data files constituting these in a storage device such as a hard disk with which the computer is provided. Furthermore, this storage device may be provided in another computer connected via a network such as the Internet.

Figure 8:
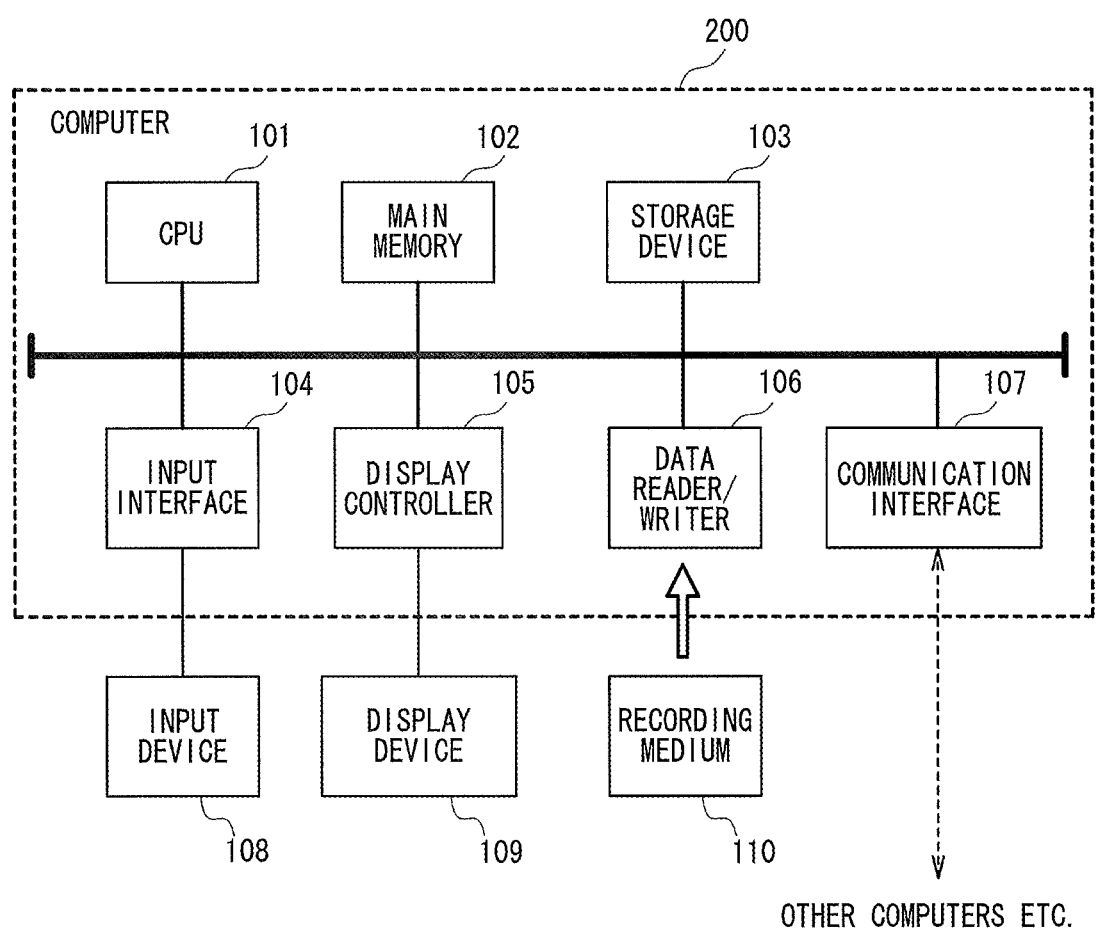
FIG. 8 is a block diagram illustrating an example of a computer which realizes a document analysis apparatus in an embodiment of the present invention.

Here, a computer which realizes the document analysis apparatus 100 by executing a program in the present embodiment will be described using FIG. 8. FIG. 8 is a block diagram illustrating an example of a computer which realizes a document analysis apparatus in an embodiment of the present invention.

As illustrated in FIG. 8, a computer 200 is provided with a CPU 101, a main memory 102, a storage device 103, an input interface 104, a display controller 105, a data reader/writer 106, and a communication interface 107. Each part of these is connected via a bus 121 so that data communication may be possible mutually.

The CPU 101 carries out various kinds of calculations by developing a program (code) in the present embodiment stored in the storage device 103 to the main memory 102 and executing these in a prescribed order. The main memory 102 is, typically, a volatile storage device such as a DRAM (Dynamic Random Access Memory). The program in the present embodiment circulates in a state of being stored in a recording medium 110, or on the Internet connected via the communication interface 107. As an example of the storage device 103, a hard disk and a semiconductor memory such as a flash memory are included.

The input interface 104 mediates data transmission between the CPU 101 and input devices 108 such as a keyboard and a mouse. The display controller 105 is connected with a display device 109, and controls displaying in the display device 109. The data reader/writer 106 mediates data transmission between the CPU 101 and the recording medium 110, and executes reading of a program from the recording medium 110, and writing of a processing result in the computer 200 to the recording medium 110. The communication interface 107 mediates data transmission between the CPU 101 and other computers.

As an example of the recording medium 110, included is a general-purpose semiconductor storage device such as a CF (Compact Flash) and a SD (Secure Digital), a magnetic storage medium such as a flexible disk (Flexible Disk), or an optical storage medium such as a CD-ROM (Compact Disk Read Only Memory).

As mentioned above, referring to an embodiment, the invention in the present application has been described. The invention in the present application is not limited to the above-mentioned embodiment and examples. In configurations and details of the invention in the present application, various modifications which a person skilled in the art can understand can be carried out within a scope of the invention in the present application.

This application claims priority on the basis of Japanese Patent Application No. 2010-029392 applied on Feb. 12, 2010, and takes in here all of the disclosures.

INDUSTRIAL APPLICABILITY

The present invention is applicable to market analysis of an attention object using a text on the Internet such as a blog, and to trend analysis of a telephone records with respect to a specific object to which an attention is paid from text data accumulated every day such as telephone records in a call center. For example, in a call center which has accepted a telephone call with respect to a mail-order business of a wide area collectively, it becomes possible to analyze a tendency of this month with respect to only a telephone call related to a product to which an attention is paid as an analysis object in a manner separated from a tendency of this month of the whole telephone calls brought to the call center.

DESCRIPTION OF SYMBOLS

10 Feature expression acquisition unit
20 Document collection acquisition unit
30 Time sequence document data base
40 Context determination unit
50 Context comparison determination unit
60 Feature expression setting unit
70 Outputting unit
410 Associated text specifying unit
420 Linguistic expression extraction unit
430 Context specifying unit

The invention claimed is:

1. A document analysis apparatus comprising a computer with a central processing unit (CPU):

the CPU being configured to function as a document collection acquisition unit which accepts an analysis object document to be an analysis object as a first document collection, and furthermore, accepts as an input a feature expression appearing during an attention period specified in advance in said first document collection, and for every said feature expression, acquires a collection of documents which have been issued, generated or updated during said attention period and in which said acquired feature expression has appeared, as a second document collection from among document collections including said first document collection;

the CPU being configured to function as a context determination unit which, for every said feature expression, specifies a document corresponding to said analysis object document as a first feature expression containing document, among documents of said second document collection in which the feature expression has appeared, and furthermore, specifies a context which is common in two or more said first feature expression containing documents as the context of the feature expression, among contexts in which the feature expression has appeared in said first feature expression containing document;

the CPU being configured to function as a context comparison determination unit which, for every said feature expression, specifies a document which does not correspond to said analysis object document as a second feature expression containing document, among documents of said second document collection in which the feature expression has appeared, and furthermore, performs comparison between a context in which the feature expression has appeared in said second feature expression containing document and a context which said CPU functioning as the context determination unit has specified; and the CPU being configured to function as a feature degree setting unit which, based on a result of comparison by said CPU functioning as the context comparison determination unit, gives a feature degree to said feature expression, or corrects a feature degree in the case where a feature degree has been given to said feature expression in advance, wherein said CPU functioning as the context determination unit, after specifying said first feature expression containing document, determines, for every said feature expression, whether a relation between the number of said first feature expression containing documents and the number of documents in which the feature expression has appeared within said second document collection fulfills a setting condition, and specifies said context in the case where said setting condition is not fulfilled, and wherein said CPU functioning as the context comparison determination unit performs a comparison between a context in which the feature expression has appeared in said second feature expression containing document and a context which said CPU functioning as the context determination unit has specified, with respect to each said feature expression for which said context has been specified.

2. The document analysis apparatus according to claim 1, wherein said CPU functioning as the context determination unit selects a text part associated with the feature expression, for every said feature expression, with respect to each said first feature expression containing document, and extracts a linguistic expression expressing a context of the feature expression from each said selected text part, and furthermore, determines whether each said linguistic expression extracted from said first feature expression containing document has appeared in common in two or more said first feature expression containing documents, and then, specifies said linguistic expression determined to have appeared in common in two or more said first feature expression containing documents as the context of the feature expression.

3. A document analysis method, comprising the steps of:
(a) accepting an analysis object document to be an analysis object as a first document collection, and furthermore, accepting as an input a feature expression which has appeared during an attention period specified in advance in said first document collection;
(b) acquiring, as a second document collection, a collection of documents which have been issued, generated or updated during said attention period and in which said acquired feature expression has appeared, from among document collections including said first document collection for every said feature expression;
(c) specifying, for every said feature expression, a document corresponding to said analysis object document as a first feature expression containing document among documents of said second document collection in which the feature expression has appeared, and furthermore, specifying a context which is common in two or more said first feature expression containing documents as the context of the feature expression, among contexts in which the feature expression has appeared in said first feature expression containing document;
(d) specifying, for every said feature expression, a document which does not correspond to said analysis object document as a second feature expression containing document, among documents of said second document collection in which the feature expression has appeared, and furthermore, performing comparison between a context in which the feature expression has appeared in said second feature expression containing document and a context specified in said Step (c); and
(e) based on a result of a comparison by said Step (d), giving a feature degree to said feature expression acquired by said Step (a) or correcting a feature degree in the case where the feature degree has been given to said feature expression in advance in said Step (a),
wherein in said Step (c), after said first feature expression containing document is specified, for every said feature expression, it is determined whether a relation between the number of said first feature expression containing documents and the number of documents in which the feature expression has appeared within said second document collection fulfils a setting condition, and in the case where said setting condition is not fulfilled, specifying of said context is performed, and
in said Step (d), with respect to each said feature expression for which said context has been specified, comparison between a context in which the feature expression has appeared in said second feature expression containing document and a context specified in said Step (c) is performed.

4. The document analysis method according to claim 3, wherein
in said Step (d), for every said feature expression, with respect to each said first feature expression containing document, a text part associated with the feature expressions is selected, and
from each selected said text part, a linguistic expression expressing a context of the feature expression is extracted, and
furthermore, it is determined whether each said linguistic expression extracted from said first feature expression containing document has appeared in common in two or more said first feature expression containing documents, and
then, said linguistic expression determined to have appeared in common in two or more said first feature expression containing documents is specified as the context of the feature expression.

5. A non-transient computer-readable recording medium in which a program including instructions is recorded, the instructions making a computer execute the steps of:
(a) accepting an analysis object document to be an analysis object as a first document collection, and furthermore, accepting as an input a feature expression which has appeared during an attention period specified in advance in said first document collection;
(b) acquiring, as a second document collection, a collection of documents which have been issued, generated or updated during said attention period and in which said acquired feature expression has appeared, from among document collections including said first document collection for every said feature expression;
(c) specifying, for every said feature expression, a document corresponding to said analysis object document as a first feature expression containing document among documents of said second document collection in which the feature expression has appeared, and furthermore, specifying a context which is common in two or more said first feature expression containing documents as the context of the feature expression, among contexts in which the feature expression has appeared in said first feature expression containing document;
(d) specifying, for every said feature expression, a document which does not correspond to said analysis object document as a second feature expression containing document, among documents of said second document collection in which the feature expression has appeared, and furthermore,
performing comparison between a context in which the feature expression has appeared in said second feature expression containing document and a context specified in said Step (c); and
(e) based on a result of a comparison by said Step (d), giving a feature degree to said feature expression acquired by said Step (a) or correcting a feature degree in the case where the feature degree has been given to said feature expression in advance in said Step (a),
wherein in said Step (c), after said first feature expression containing document is specified, for every said feature expression, it is determined whether a relation between the number of said first feature expression containing documents and the number of documents in which the feature expressions has appeared within said second document collection fulfils a setting condition, and in the case where said setting condition is not fulfilled, specifying of said context is performed, and
in said Step (d), with respect to each said feature expression for which said context has been specified, comparison between a context in which the feature expression has appeared in said second feature expression containing document and a context specified in said Step (c) is performed.

6. The non-transitory computer-readable recording medium according to claim 5, wherein
in said Step (d), for every said feature expression, with respect to each said first feature expression containing document, a text part associated with the feature expression is selected, and from each said selected text part, a linguistic expression expressing a context of the feature expression is extracted, and furthermore, it is determined whether each said linguistic expression extracted from said first feature expression containing document has appeared in common in two or more said first feature expression containing documents, and then, said linguistic expression determined to have appeared in common in two or more said first feature expression containing documents is specified as the context of the feature expression.

* * * * *